June 14, 1949.  R. WORTMAN  2,473,462
METERING MEANS FOR A BOTTLE HAVING A LOCK TO
ENSURE THE TIPPING OF THE BOTTLE TO DISPENSE
Filed Oct. 8, 1948  2 Sheets-Sheet 1
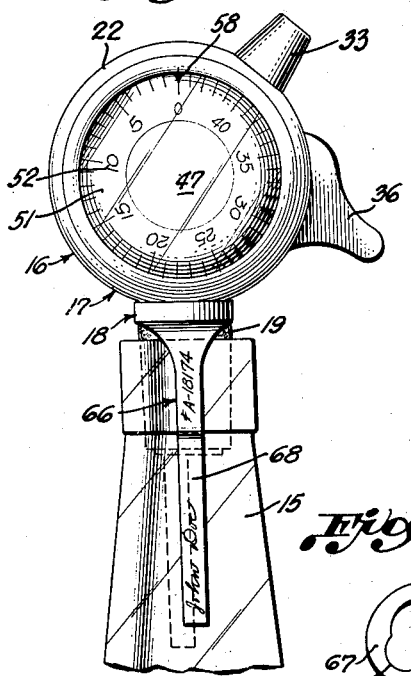
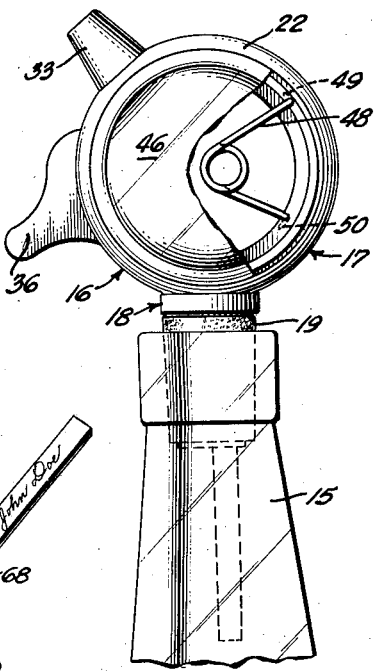
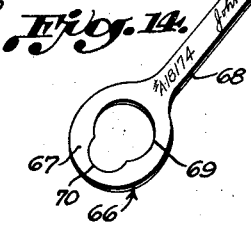
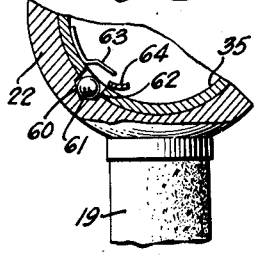
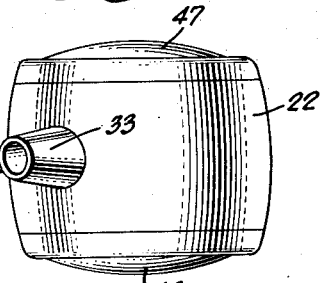
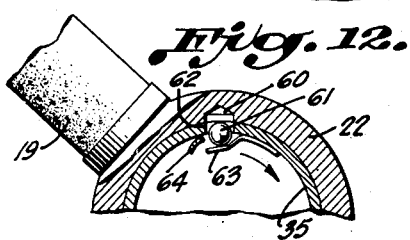
Inventor
ROBERT WORTMAN
By Ben Cohen
ATTORNEY

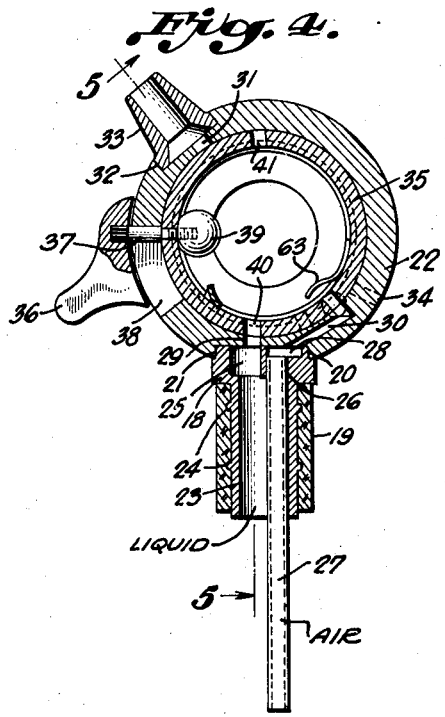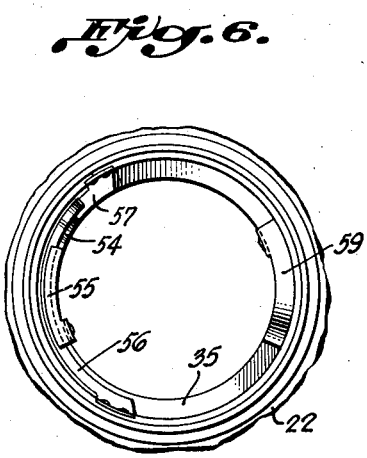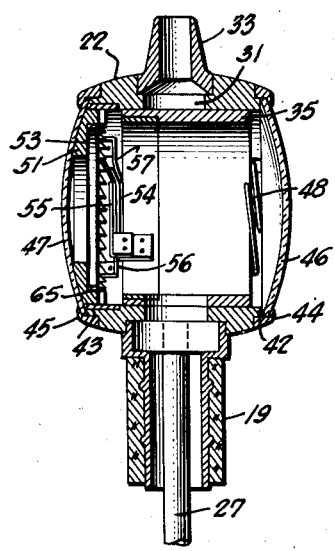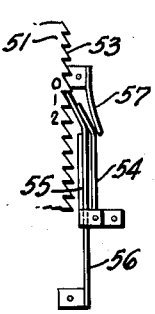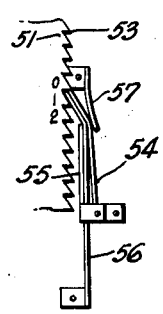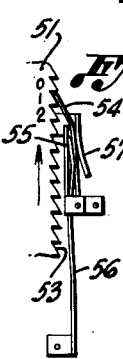

Patented June 14, 1949

2,473,462

UNITED STATES PATENT OFFICE 2,473,462

METERING MEANS FOR A BOTTLE HAVING A LOCK TO ENSURE THE TIPPING OF THE BOTTLE TO DISPENSE

Robert Wortman, Detroit, Mich., assignor to J. E. Berger Corporation, Detroit, Mich.

Application October 8, 1948, Serial No. 53,535

10 Claims. (Cl. 222—38)

The present invention relates to a liquid dispenser particularly adaptable to conventional whiskey bottles, which will measure and dispense on each operation of the device a predetermined quantity of the contents of the bottle, and which will at the same time, register and record a unit quantity of the contents each time the dispenser is operated.

The dispenser is of particular value in commercial establishments where whiskey is sold over the bar. At such places there is considerable loss in whiskey, either through accidental spilling of the whiskey or through the favoring of certain customers by the bartender. By the use of the present device, accidental spilling can be eliminated because of the fact that the amount to be poured is predetermined. The bartender can quickly pour the whiskey without worrying that the whiskey will overflow the jigger being filled. A great deal of the loss in liquor establishments results from the dishonesty of bartenders in pouring larger drinks than the size being paid for by the customers. This loss is eliminated by the present dispenser which pours only a predetermined amount and registers the number of drinks poured.

With the present improved dispenser, taking of inventory at frequent intervals is greatly simplified. Since the total original contents of any particular bottle is generally known, and since the number of drinks dispensed is recorded on the dispenser, it is a simple matter to estimate the quantity of whiskey remaining in the bottle.

In certain bars it has been customary to provide a customer with a bottle of whiskey, marking the level of the whiskey on the bottle before and after consumption and estimating the amount of whiskey consumed, and thereafter making the proper charge based on the estimated amount. With the present dispenser, it is only necessary to note the number on the register before and after consumption, and charge for the number of drinks consumed.

A further feature of the present invention is the provision of a novel sealing arrangement to prevent removal of the dispenser from the neck of the bottle without destroying the seal thus insuring against tampering with the contents of the bottle. The special seal used is stamped with a serial number thus enabling the bar owner to keep an accurate record of the number of bottles consumed over a period of time. The seal is also provided with the signature of the bar owner to protect against the use of fake seals.

A still further feature of the present invention is the provision of a novel locking means to prevent accidental manipulation of the recorder except when the whiskey is being dispensed.

Another feature of the present invention is the provision of a locking arrangement for preventing further manipulation of the dispensing handle beyond the last number listed on the recorder, thereby necessitating removal of the dispenser from the bottle in order to reset the mechanism.

Yet another important feature of the present invention is the provision of simplified means for varying the volume of the measuring chamber.

Attempts have been made in the past to provide a dispenser which measures and records but none have been successful either due to the complicated structure involved or because of inability to provide a dispenser which is tamperproof. A device of this general nature is shown in Patent No. 2,209,766 patented July 30, 1940. The present device presents numerous advantages over any prior art device, being of relatively simple construction and being absolutely tamperproof.

Further objects and advantages of the instant device over prior art constructions will be readily apparent to those skilled in this art from the following detailed description taken in connection with the accompanying drawings showing a preferred embodiment of the invention, and in which Figure 1 is a view in side elevation of the neck of a bottle with the device of the present invention inserted therein.

Figure 2 is a similar view of the reverse side of the device shown in Figure 1, with a portion thereof broken away.

Figure 3 is a top plan view of Figure 1.

Figure 4 is a vertical sectional view taken through the center of the dispenser shown in Figure 1.

Figure 5 is a vertical sectional view taken on the line 5—5 of Figure 4.

Figure 6 is a front elevational view of the dispenser with certain elements removed to more clearly show the indexing springs.

Figures 7, 8, 9 and 10 are schematic views of the various stages of operation of the indexing springs.

Figure 11 is a sectional detail view of the locking ball with the dispenser in an upright position.

Figure 12 is a sectional detail view of the locking ball with the dispenser in pouring position.

Figure 13 is a similar view with the locking spring in its locked position.

Figure 14 is a plan view of the special seal member.

Referring to the drawings in detail wherein similar reference numerals designate similar parts throughout the several views, numeral 15 designates the neck of a bottle which is conventional for most types of whiskey bottles. The dispenser generally indicated by the numeral 16, may be formed of any suitable rust-proof metal, or of plastic material, but in its preferred form has the major elements thereof formed of stainless steel or aluminum. The dispenser comprises the main housing 17 and a bottle engaging member 18, which member may include a sealing element 19.

The bottle engaging member 18 consists of a tubular fitting having a reduced upper portion 20 and adapted to be press fitted within an opening 21 formed at the lower end of outer casing 22. The fitting is formed with a depending, reduced, cylindrical portion 23 to receive the sealing element 19, said portion 23 and sealing element 19 adapted to extend within the neck of a bottle with a sealing engagement. Ribs 24 may be provided on the outer surface of the cylindrical portion 23 to retain the sealing element 19 against slipping.

The tubular fitting 18 is closed at its upper end except for a transverse slot 25 communicating with the interior of the cylindrical portion 23 forming therewith a liquid passage from the bottle to the main dispenser chamber as will be pointed out as the description proceeds. The upper end of the tubular fitting is further provided with a cylindrical bore 26 adapted to receive a tube 27 extending below the tubular fitting and forming an air passage for the air trapped within the dispenser. The upper end of the bore 26 terminates in a slotted portion 28 for a purpose to be described.

The main housing of the dispenser comprises an outer cylindrical casing 22, having the recessed portion or opening 21 at the lower end thereof to receive the tubular fitting 18. Formed within the confines of the recessed opening 21, there is provided a slot 29 in communication with the slot 25 in the tubular fitting. A passageway 30 is formed in the casing 22, the lower end of the passageway terminating within the recessed portion 21, adjacent the slotted portion 28. The upper end of the passageway 30 terminates within the casing 23, a slight distance from the slot 29 and at a point diametrically opposite a slot 31 formed as a dispensing opening for the contents of the dispenser. The location of this inner terminating point for the passageway 30 insures a complete filling of the measuring chamber when the dispenser is in pouring position. A vent opening 34 is provided in the casing adjacent the passageway 30.

A recessed portion 32 is formed in the casing for receiving a pouring spout 33 which is press-fitting within said recess. The dispensing slot 31 is located within the confines of the recess.

The inner casing is in the form of a rotatably mounted valve member 35 closely fitting the inner surface of the casing 22. The valve member has limited rotational movement and is operated by a handle member 36. A threaded pin 37 has its inner end threaded through a threaded opening in the sleeve 35, said inner end extending a slight distance within the sleeve. The outer end of the pin 37 is threaded to the handle 36.

The intermediate part of the pin moves in a slot 38 formed in the outer casing 22. The length of the slot 38 determines the arc of rotation of the sleeve 35.

As seen in Figure 4, a spherical member 39 is threaded to the inner end of the pin 37. This spherical member is provided in various sizes and is used to vary the volume of the pouring chamber. Thus by substituting a larger sphere for the sphere shown, the volume of the chamber within the casing may be reduced.

The valve member 35 is provided with offset slotted portions 40 and 41 forming filling and dispensing apertures for the interior of the casing. In the normal position of the valve member, slotted portion 40 is juxtadisposed over the slot 29 and slotted portion 41 is off-set from slot 31 a distance substantially equal to the length of slot 38. Thus, when the valve member 35 is rotated its full amount, slotted portion 41 is juxtadisposed over slot 31 and slotted portion 40 offset with respect to slot 29. A vent opening (not shown) is provided in the valve member 35 and when the valve is rotated to the full pouring position, this vent opening coincides with vent opening 34 in the casing whereby venting the interior of the casing to the atmosphere during the pouring operation.

Referring to Figure 5, the casing 22 is provided with a pair of reduced edge portions forming shoulders 42, 43 for receiving locking crystal holding rims 44, 45. The rims are fitted over the shoulders of the casing and are held in tight frictional engagement with the casing in the same manner as the crystal holding rim on a watch. The rims 44 and 45 may be pried off the casing by a suitable sharp instrument. The crystals, indicated by numerals 46 and 47, may be of glass or suitable plastic material which is transparent and when locked to the casing, forms a leak-proof chamber for the whiskey.

As seen in Figures 2 and 5, a coiled spring member 48 is provided adjacent the crystal 46 for holding the valve in normally closed position and for returning the valve to closed position after it has been rotated for pouring. The ends of the spring 48 are indicated by numerals 49 and 50 and are inserted in openings formed in the casing and valve respectively. The ends 49 and 50 are bent to diverge outwardly in order to prevent the ends from accidentally slipping out of the openings.

The novel counter and recording mechanism is located adjacent the crystal 47 and consists of the following. An index wheel 51 is loosely carried in the space formed between the crystal 47 and the edge of the cylindrical valve member. The outer face of the index wheel is provided with a series of numbers 52, shown herein as being forty-five in number and running consecutively from zero to forty-five. The inner face of the wheel is serrated to provide a plurality of notches 53 extending around the entire periphery of the wheel, each notch corresponding with a number on the outer face of the wheel.

The means for advancing the index wheel comprises a pair of pawls 54, 55 secured to the edge of the rotating valve 35. Pawl 54 is the longer of the two and has its free end bowed outwardly towards the index wheel and normally rests within one of the notches on the index wheel. This pawl may also be referred to as the indexing pawl. A stationary pawl 56 is connected to the casing and extends between the pawls 54 and 55. The free end of the stationary pawl extends a slight distance beyond the indexing pawl for reasons to be described. A short pawl 57 is secured to the casing and has its free end extending towards the ends of the other pawls. The free end of pawl 57 is bent towards the valve member and rests between the end of the indexing pawl and the valve.

The operation of the counter mechanism is as follows:

In the normal position of the operating parts before the dispensing operation, the stationary pawl 56 is in the notch indicated by numeral 1 in Figure 7. When the operating handle is moved resulting in the rotation of valve member 35, pawl 54 enters notch 1 and advances the index wheel a distance equivalent to three notches. During this advancement, the bent end of pawl 56 is held between the straight pawl 55 and the straight portion of pawl 54. This is clearly shown in Figures 8 and 9 of the drawings. After the contents of the chamber is completely dispensed, the operating handle is released and the spring 48 returns the valve to its original position. As the valve returns to its original position, the end of pawl 54 being held tight against notch 1 of the index wheel by the pawl 57 drags the index wheel back with it until the free end of pawl 56 is freed, at which time it moves toward the index wheel and enters notch 2 of the index wheel and holds the index wheel at this position while the pawls 54 and 55 move back with the valve. Thus, the parts are in their original position except that the pawl 56 is in notch 2 instead of notch 1, thus registering one advance of the wheel. This is clearly shown in Figure 10. The effect of this novel arrangement is to advance the index wheel three notches and return the wheel two notches each time the valve is operated thus showing the dispensing of one drink. This operation is repeated until the bottle is emptied and the total number of drinks dispensed registered on the index wheel.

As seen in Figure 1, an indexing mark 58 is provided on the crystal 47 to indicate the position of the index wheel. To prevent the index wheel from wobbling within the casing, a spring member 59 is secured to the valve 35 at a point opposite the pawls and presses lightly against the index wheel.

It is important in devices of this nature to prevent rotation of the valve member except during the pouring operation. Otherwise, if the operating handle is depressed while the bottle is in an upright position, the index wheel will register a drink without an actual dispensing of the drink. Thus, there is provided a novel locking arrangement for preventing manipulation of the operating handle except when the bottle is in pouring position. Referring to Figure 11, a depression 60 is formed on the inner surface of the casing 22 and receives a spherical ball 61 therein, with a portion of the ball projecting beyond the surface of the casing. A complementary opening 62 is formed in the valve 35, said opening being of sufficient size to permit passage of the ball therethrough. A restraining member 63 is mounted adjacent the opening 62 and is so positioned as to prevent complete passage of the ball through the opening but permitting partial passage to permit the ball to drop out of the depression 60 when the bottle is inverted thereby permitting rotation of the valve, as shown in Figure 12. Thus, Figure 11 shows the bottle in an upright position with the ball in locking position, whereas in Figure 12, the bottle is inverted and the ball in unlocked position.

In the inverted position of the bottle shown in Figure 12, it is possible to manipulate the index wheel by holding a finger over the pouring opening and manipulating the valve to make a complete revolution of the index wheel to any desired position. To prevent more than one single revolution of the index wheel without removing the dispenser from the bottle, there is provided a locking finger 64 mounted on a ring 65 secured to the inner surface of the index wheel for rotation therewith. The ring 65 is so mounted that when the index wheel registers 43, the locking finger 64 presses against the ball 61, as seen in Figure 13 and locks the valve against further rotation. In order to unlatch this finger, it is necessary to remove the dispenser from the neck of the bottle and insert a special tool through the inlet opening of the dispenser. The removal of the dispenser from the neck of the bottle will show tampering as pointed out below.

An important feature of the present invention is the novel sealing arrangement for preventing removal of the dispenser without the knowledge or authority of the bar owner. The seal is shown in Figure 14 and consists of a flat strip 66 having an enlarged ring-like portion 67 and a narrow sealing portion 68. The ring-like portion 67 has a circular opening 69 and a section 70 of a smaller circle extending therefrom. The diameter of the circular opening 69 is of such size as to permit the cylindrical portion 23 and ridges 24 to pass therethrough without disrupting the seal. It will be understood that the cork 19 is removed from cylindrical portion 23 before the seal is assembled. After the cork is secured in place, the seal is pulled to one side in order that the upper part of 23 enters the smaller circle section 70. When the dispenser is inserted in the bottle, the narrow sealing portion 68 whose under side is provided with a suitable adhesive is adhesively secured to the neck of the bottle. Thus, any attempt to remove the dispenser would destroy the seal. Since circular section 70 is of less diameter than the ridges 24, any attempt to remove the dispenser without tearing the portion glued to the bottle neck would result in a tearing of the ring portion of the seal. The outer face of the seal is provided with a serial number and the signature of the bar owner. The serial number indicates the number of seals used up in a certain period of time and thereby the number of bottles consumed. The signature is added to prevent unauthorized substitution of forged seals. Thus, the likelihood of tampering with the seals by the bartender is substantially eliminated.

The operation and advantages of the present improved construction are as follows: With the dispenser applied to the neck of the bottle and sealed thereto as indicated above, and it being desirable to dispense a drink therefrom, the bartender inverts the bottle causing the contents to flow through inlet 25 into the interior of the casing or liquid chamber. This is very easily and quickly accomplished in that the bottle may be turned entirely upside down without danger of any of the contents spilling or leaking. When the chamber has been entirely filled and this can be seen through the crystals forming part of the housing, handle 36 is then depressed causing rotation of the valve 35. This closes off opening 29 and brings opening 41 into registration with opening 31. At the same time the vent opening in valve 35 is brought into registration with vent opening 34 in the casing so that air may enter the casing as the contents are poured out. In this way a drink may be dispensed from the bottle very quickly in that the contents of the measuring chamber may be emptied into a glass about as fast as the liquid can be poured. At the same time the customer is assured of securing the full quantity paid for.

During the pouring operation, rotation of the operating handle advances the index wheel one tooth thereby recording the number of drinks dispensed. After a bottle has been emptied, the dispenser is removed from the bottle thereby destroying the seal. The index wheel is then reset to zero, after which a new seal is applied and the dispenser applied to a new bottle.

From the above detailed description of the invention, it is readily apparent that the dispensing device herein shown and described is well adapted to accomplish the objects and advantages previously set forth. It will be appreciated that the dispensing device is a very simple and durable construction and that it may be applied to various types of bottles from which it is desired to dispense liquids. It will be clear that minor changes may be made in the shape and construction of the parts without departing from the spirit of the invention. Therefore, I do not wish to be limited precisely to the construction herein shown and described except as may be required by the following claims considered with respect to the prior art.

I claim:

1. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, a transparent crystal forming a part of the casing wall, and an index wheel positioned between the crystal and the rotary valve for registering the amount of liquid dispensed.

2. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, a transparent crystal forming a part of the casing wall, an index wheel positioned between the crystal and the rotary valve for registering the amount of liquid dispensed, and said index wheel having notches formed on its inner wall surface.

3. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, a transparent crystal forming a part of the casing wall, an index wheel positioned between the crystal and the rotary valve for registering the amount of liquid dispensed, said index wheel having notches formed on its inner wall surface, and means for advancing said index wheel one notch for each complete operation of the valve.

4. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, a transparent crystal forming a part of the casing wall, an index wheel positioned between the crystal and the rotary valve for registering the amount of liquid dispensed, said index wheel having notches formed on its inner wall surface, and means for advancing said index wheel three notches upon forward movement of the valve and for returning said index wheel two notches upon return movement of the valve.

5. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, and locking means between the casing and the valve member for preventing rotation of the valve member while the device is in non-pouring position.

6. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, locking means between the casing and the valve member for preventing rotation of the valve member while the device is in non-pouring position, a transparent crystal forming a part of the casing wall, an index wheel positioned between the crystal and the rotary valve for registering the amount of liquid dispensed, said index wheel having notches formed on its inner wall surface, and means for advancing said index wheel three notches upon forward movement of the valve and for returning said index wheel two notches upon return movement of the valve.

7. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, and a depression formed in the casing adjacent the inlet, a locking ball having a portion thereof seated in said depression, and means in the valve for receiving said ball when the device is in pouring position to permit rotation of the valve.

8. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, a transparent crystal forming a part of the casing wall, an index wheel positioned between the crystal and the rotary valve for registering the amount of liquid dispensed, said index wheel having notches formed on its inner wall surface, means for advancing said index wheel one notch for each complete operation of the valve, and a depression formed in the casing adjacent the inlet, a locking ball having a portion thereof seated in said depression, and means in the valve for receiving said ball when the device is in pouring position to permit rotation of the valve.

9. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, a transparent crystal forming a part of the casing wall, an index wheel positioned between the crystal and the rotary valve for registering the amount of liquid dispensed, said index wheel having notches formed on its inner wall surface, means for advancing said index wheel one notch for each complete operation of the valve, a depression formed in the casing adjacent the inlet, a locking ball having a portion thereof seated in said depression, and means in the valve for receiving said ball when the device is in pouring position to permit rotation of the valve, and means for locking said index wheel against a complete rotation.

10. A device for dispensing liquids from bottles comprising means providing a casing applicable to the neck of a bottle having an inlet leading from the interior of the bottle and an outlet leading from the casing, a rotary valve within the casing having openings in its wall adapted to be brought into registration with the inlet and outlet respectively, a slot in the casing, an operating handle secured to the rotary valve and extending through said slot in the casing for rotating the valve from closed to pouring position, spring means connected to the casing and the valve for normally urging the valve into a position wherein the outlet is closed, a transparent crystal forming a part of the casing wall, an index wheel positioned between the crystal and the rotary valve for registering the amount of liquid dispensed, said index wheel having notches formed on its inner wall surface, means for advancing said index wheel one notch for each complete operation of the valve, a depression formed in the casing adjacent the inlet, a locking ball having a portion thereof seated in said depression, and means in the valve for receiving said ball when the device is in pouring position to permit rotation of the valve, and means comprising a ring member secured to the index wheel, and a finger extending from said ring member for moving the locking ball into locking position.

ROBERT WORTMAN.

REFERENCES CITED

The following references are of record in the file of this patent:

UNITED STATES PATENTS

| Number | Name | Date |
|---|---|---|
| 845,531 | Davison | Feb. 26, 1907 |
| 1,957,881 | Fouga | May 8, 1934 |
| 1,969,385 | Raemer | Aug. 7, 1934 |
| 2,209,766 | Dale | July 30, 1940 |
| 2,419,891 | Gottschalk | Apr. 29, 1947 |

FOREIGN PATENTS

| Number | Country | Date |
|---|---|---|
| 583,028 | Germany | Aug. 30, 1933 |